United States Patent
Sankar et al.

(10) Patent No.: US 9,888,215 B2
(45) Date of Patent: Feb. 6, 2018

(54) INDOOR SCENE CAPTURE SYSTEM

(71) Applicant: University of Washington through its Center for Commercialization, Seattle, WA (US)

(72) Inventors: Aditya Sankar, Seattle, WA (US); Steven Maxwell Seitz, Seattle, WA (US)

(73) Assignee: University of Washington, Seattle, WA (US)

( * ) Notice: Subject to any disclaimer, the term of this patent is extended or adjusted under 35 U.S.C. 154(b) by 390 days.

(21) Appl. No.: 14/262,439

(22) Filed: Apr. 25, 2014

(65) Prior Publication Data

US 2014/0320661 A1    Oct. 30, 2014

Related U.S. Application Data

(60) Provisional application No. 61/816,434, filed on Apr. 26, 2013.

(51) Int. Cl.
*H04N 7/18* (2006.01)
*H04N 5/232* (2006.01)
*G06T 7/55* (2017.01)
*G01C 21/16* (2006.01)

(52) U.S. Cl.
CPC ............ *H04N 7/183* (2013.01); *G06T 7/55* (2017.01); *H04N 5/23216* (2013.01); *H04N 5/23238* (2013.01); *H04N 5/23293* (2013.01); *G01C 21/16* (2013.01); *G06T 2207/20101* (2013.01)

(58) Field of Classification Search
None
See application file for complete search history.

(56) References Cited

U.S. PATENT DOCUMENTS

| 6,009,359 A | 12/1999 | El-Hakim et al. |
| 7,912,583 B2 | 3/2011 | Gutmann et al. |
| 8,031,933 B2 | 10/2011 | Se et al. |

(Continued)

FOREIGN PATENT DOCUMENTS

WO    WO-2006084385 A1    8/2006

OTHER PUBLICATIONS

Igor Arambasic et al., "Anchor-less Self-Positioning in Rectangular Room Based on Sectorized Narrowband Antennas", European Wireless 2013; 19th European Wireless Conference (Apr. 2013).*

(Continued)

*Primary Examiner* — Frederick Bailey
(74) *Attorney, Agent, or Firm* — Perkins Coie LLP

(57) ABSTRACT

An indoor scene capture system is provided that, with a handheld device with a camera, collects videos of rooms, spatially indexes the frames of the videos, marks doorways between rooms, and collects videos of transitions from room to room via doorways. The indoor scene capture system may assign a direction to at least some of the frames based on the angle of rotation as determined by an inertial sensor (e.g., gyroscope) of the handheld device. The indoor scene capture system marks doorways within the frames of the videos. For each doorway between rooms, the indoor scene capture system collects a video of transitioning through the doorway as the camera moves from the point within a room through the doorway to a point within the adjoining room.

15 Claims, 13 Drawing Sheets

(56) References Cited

U.S. PATENT DOCUMENTS

| | | | |
|---|---|---|---|
| 8,150,650 B2 | 4/2012 | Goncalves et al. | |
| 8,531,522 B2* | 9/2013 | Horovitz | H04N 7/181 348/143 |
| 8,711,218 B2* | 4/2014 | Zehavi | G01S 5/16 348/143 |
| 8,768,141 B2* | 7/2014 | Chan | H04N 5/77 386/224 |
| 9,001,116 B2* | 4/2015 | Ben-David | G06T 17/05 345/419 |
| 2013/0089301 A1* | 4/2013 | Ju | H04N 5/91 386/241 |

OTHER PUBLICATIONS

Igor Arambasic et al., "Self-positioning and mapping of rectangular rooms with sectorized narrowband antennas", SoftCOM 2012, 20th International Conference on Software, Telecommunications and Computer Networks (Sep. 2012).*

Pomp, *Smartphone-Based Indoor Mapping* (2012) (thesis, RWTH Aachen University, Germany).

Shin et al., *Unsupervised Construction of an Indoor Floor Plan Using a Smartphone*, 42 IEEE Transactions on Systems, Manufacturing, and Cybernetics 889-98 (Nov. 2012).

Zhuang et al., *SMART: Simultaneous Indoor Localization and Map Construction Using Smartphones*, The 2010 International Joint Conference on Neural Networks 1-8 (Jul. 2010).

Anguelov et al., "Google Street View: Capturing the World at Street Level," Computer, Jun. 2010, 43(6): pp. 32-38.

Brooks, "Walk Through—A Dynamic Graphics System for Simulating Virtual Buildings," Proceedings of I3D'86, 1987, pp. 9-21.

Coorg et al., "Extracting Textured Vertical Facades from Controlled Close-Range Imagery," Proceedings of CVPR, 1999, pp. 625-632.

Flint et al. "Manhattan Scene Understanding Using Monocular, Stereo, and 3D Features," Proceedings of ICCV, 2011, pp. 2228-2235.

Furukawa et al., "Reconstructing Building Interiors from Images," Proceedings of ICCV '09, 2009, p. 80-87.

Ishiguro et al., "Omnidirectional Visual Information for Navigating a Mobile Robot," Proceedings of ICRA, 1993, pp. 799-804.

Coughlan et al., "Manhattan World: Compass Direction from a Single image by Bayesian Interference" Proceedings of ICCV, 1999, pp. 941-947.

Kim et al., "Interactive Acquisition of Residential Floor Plans," Proceedings of ICRA, 2012, pp. 3055-3062.

Lippman, A., "Movie-Maps: An Application of the Optical Videodisc to Computer Graphics," Proceedings of SIGGRAPH, 1980, pp. 32-42.

Nocedal et al., "Numerical Optimization," Springer Series in Operations Research, Springer-Verlag: New York, 1999, Chapter 10, pp. 251-275.

Reitmayr et al., "Going out: robust model-based tracking for outdoor augmented reality" Proceedings of ISMAR, 2006, pp. 109-118.

Sankar et al., "Capturing Indoor Scenes With Smartphones," Proceedings of the 25th Annual ACM Symposium on User Interface Software and Technology, Oct. 2012, pp. 403-412.

Shin et al., "Unsupervised Construction of an Indoor Floor Plan Using a Smartphone," IEEE Transactions on Systems, Man, and Cybernetics, vol. PP, Issue 99, 2011, pp. 1-10.

Snavely et al., "Photo Tourism: Exploring Photo Collections in 3D," Proceedings of SIGGRAPH, pp. 835-846.

Szeliski et al., "Creating Full View Panoramic Image Mosaics and Environment Maps," Proceedings of SIGGRAPH, 1997, pp. 251-258.

Taylor et al., "VideoPlus: A Method for Capturing the Structure and Appearance of Immersive Environments," IEEE Transactions on Visualization and Computer Graphics, 8(2), 2002, pp. 171-182.

Tsang et al., "Boom chameleon: simultaneous capture of 3D viewpoint, voice and gesture annotations on a spatially-aware display" Proceedings of the 15th annual ACM symposium on User Interface Software and Technology, Oct. 2002, pp. 111-120.

Uyttendaele et al. "Image-Based Interactive Exploration of Real-World Environments," IEEE Computer Graphics and Applications, 2004, 24: pp. 52-63.

Yagi et al., "Real-Time Omnidirectional Image Sensor (COPIS) for Vision-Guided Navigation," IEEE Transactions on Robotics and Automation, (10)1, 1994, pp. 11-22.

Zandbergen, "Accuracy of iPhone locations: A comparison of assisted GPS, WiFi and cellular positioning" Transactions in GIS, 2009, 13(s1), pp. 5-26.

Google Inc., Google Art Project, accessed Aug. 7, 2017 <https://en.wikipedia.org/w/index.php?title=Google_Art_Project&oldid=793707847>.

Goldman et al., "Schematic storyboarding for video visualization and editing," Proceedings of Siggraph, 2006, pp. 862-871.

Microsoft Bing Maps, accessed Aug. 7, 2017 <https://en.wikipedia.org/w/index.php?title=Bing_Maps&oldid=793653167>.

Microsoft Corporation, Photosynth, accessed Aug. 7, 2017, <https://en.wikipedia.org/w/index.php?title=Photosynth&oldid=768360186>.

Quiksee, accessed Aug. 7, 2017, <https://www.tnooz.com/article/quicksee-3d-location-video-startup-bought-by-google/>.

Sensopia Inc., MagicPlan, accessed Aug. 7, 2017 <http://www.magic-plan.com/magicplan/>.

\* cited by examiner

INDOOR SCENE CAPTURE SYSTEM

CROSS-REFERENCE TO RELATED APPLICATION(S)

The present application claims benefit of U.S. Provisional Application No. 61/816,434, filed Apr. 26, 2013, which is incorporated herein by reference in its entirety.

STATEMENT OF GOVERNMENT INTEREST

This invention was made with government support under IIS-0963657 and IIS-0811878, awarded by the National Science Foundation, and N66001-09-C-2004, awarded by Space and Naval Warfare Systems Command. The government has certain rights in the invention.

BACKGROUND

In 1979, Lippman used gryostabilized cameras mounted on top of a car to create an interactive visualization of downtown Aspen, Colo. (Lippman, A., "Movie-Maps: An Application of the Optical Videodisc to Computer Graphics," Proceedings of SIGGRAPH, 1980, pp. 32-42.) This early hypermedia system, a forerunner of Google's Street View, pioneered the use of spatially indexed imagery for generating interactive video tours. Lippman's system allowed users to interactively explore an environment and presented the user with a sense of "being there." The desire to enhance and improve the notion of visual presence has subsequently fueled a sizable body of work around interactive visual tours. However, most of these approaches rely on specialized data acquisition equipment and complex and time-consuming off-line processing pipelines, making them inaccessible to the casual user.

The idea of indoor interactive video tours has been explored by several authors in the fields of graphics, vision, and human-computer interaction. In 1986, Brooks was one of the first to propose a system to build rapid visual prototypes of buildings for architectural use. (Brooks, F., "WalkThrough—A Dynamic Graphics System for Simulating Virtual Buildings," Proceedings of I3D'86, 1987, pp. 9-21.) More recently, Uyttendaele used an omnidirectional video to create indoor virtual tours. (Uyttendaele, M., Criminisi, A., Kang, S. B., Winder, S., Szeliski, R., and Hartley, R., "Image-Based Interactive Exploration of Real-World Environments," IEEE Computer Graphics and Applications, 2004, 24: pp. 52-63.) Similar approaches are used in Google's Streetview and Art Project. (Anguelov, D., Dulong, C., Filip, D., Frueh, C., Lafon, S., Lyon, R., Ogale, A., Vincent, L., and Weaver, J., "Google Street View: Capturing the World at Street Level," June 2010, Computer, 43(6): pp. 32-38; Google Inc., Google Art Project, 2011, http://www.googleartproject.com.) These approaches require sophisticated omnidirectional camera rigs and several hours of offline processing. Quiksee, in contrast, uses a hand-held camcorder and an offline processing pipeline and requires manual spatial registration and does not model the geometry of the scene.

Early mobile robot navigation systems, such as those proposed by Ishiguro and Yagi, utilized omnidirectional camera systems combined with odometry measurements to reconstruct environments for mobile robot navigation. (Ishiguro, H., Ueda, K. and Tsuji, S., "Omnidirectional Visual Information for Navigating a Mobile Robot," Proceedings of ICRA, 1993, pp. 799-804; Yagi, Y., Kawato, S. and Tsuji, S., "Real-Time Omnidirectional Image Sensor (COPIS) for Vision-Guided Navigation," IEEE Transactions on Robotics and Automation, (10)1, 1994, pp. 11-22.) Taylor also estimated camera position and environment geometry from video data. (Taylor, C. J., "VideoPlus: A Method for Capturing the Structure and Appearance of Immersive Environments," IEEE Transactions on Visualization and Computer Graphics, 8(2), 2002, pp. 171-182.) Taylor's approach required the user to specify several point-and-line correspondences in keyframes of the omnidirectional video. The visual simultaneous location and mapping ("SLAM") and computer vision communities have developed automatic approaches to reconstruct indoor scenes from images. (Flint, A., Murray, D., and Reid, I., "Manhattan Scene Understanding Using Monocular, Stereo, and 3D Features," Proceedings of ICCV, 2011, pp. 2228-2235; Furukawa, Y., Curless, B., Seitz, S. M., and Szeliski, R., "Reconstructing Building Interiors from Images," Proceedings of ICCV '09, 2009, p. 80-87; Snavely, N., Seitz, S. M., and Szeliski, R., "Photo Tourism: Exploring Photo Collections in 3D," Proceedings of SIGGRAPH, pp. 835-846; Coorg, S., and Teller, S., "Extracting Textured Vertical Facades from Controlled Close-Range Imagery," Proceedings of CVPR, 1999, pp. 625-632; Szeliski, R. and Shum, H., "Creating Full View Panoramic Image Mosaics and Environment Maps," Proceedings of SIGGRAPH, 1997, pp. 251-258.) While computer vision-based 3D reconstruction has demonstrated potential, it is computationally expensive and does not work well on texture-poor surfaces (e.g., painted walls), which dominate interiors. SLAM-based reconstruction has been shown to work on smartphones, but may be restricted to modeling only corridors. (Shin, H., Chon, Y., Cha, H., "Unsupervised Construction of an Indoor Floor Plan Using a Smartphone," IEEE Transactions on Systems, Man, and Cybernetics, Volume PP, Issue 99, 2011, pp. 1-10.) Kim employed a Manhattan-world assumption to acquire indoor floor plans in real-time. (Kim, Y. M., Dolson, J., Sokolsky, M., Koltun, V., Thrun, S., "Interactive Acquisition of Residential Floor Plans," Proceedings of ICRA, 2012, pp. 3055-3062.) Kim's approach is hardware-intensive, requiring the user to carry a Kinect camera, a projector, a laptop, and a special input device while capturing data around the house.

The recent shift of imaged-based systems to the mobile phone platform is exemplified by the mobile Photosynth application that creates panoramic images in real time on a smartphone. (Microsoft Corporation, Photosynth, 2011, http://photosynth.net/.) MagicPlan is a commercial floor plan generation app available for the iPhone. (Sensopia Inc., MagicPlan, 2011, http://www.sensopia.com.) By marking floor corners in the room via an augmented reality interface, MagicPlan is able to estimate dimensions of the room and generate a corresponding floor plan. MagicPlan reconstructs rooms individually and then has a user manually assemble them to form a complete floor plan.

DETAILED DESCRIPTION

Figure 1A:
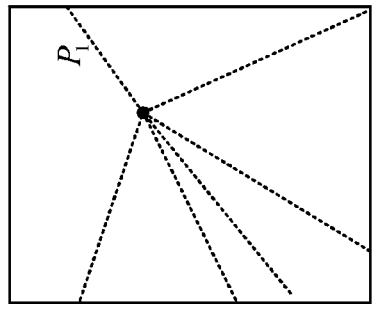
FIG. 1A illustrates a top-down view of a scene.

In some embodiments, an indoor scene capture system is provided that collects videos of rooms, spatially indexes the frames of the videos, marks doorways between rooms, and collects videos of transitions from room to room via doorways. For each of the rooms, the indoor scene capture system collects a video of the room as a camera rotates around a point within the room and assigns directions to frames of the video as the camera is rotated. For example, a user may hold a smartphone containing the camera and from the center of a room rotate 360° while collecting the frames of the video. The indoor scene capture system may assign a direction to at least some of the frames based on the angle of rotation as determined by an inertial sensor (e.g., gyroscope) of the smartphone. The indoor scene capture system marks doorways within the frames of the videos. For example, the indoor scene capture system may allow a user to mark doorways on the frames as the video is being collected. For each doorway, the indoor scene capture system collects a video of transitioning through the doorway as the camera moves from the point within a room through the doorway to a point within the adjoining room. For example, after marking a doorway, the user may indicate to collect a video of transitioning through the doorway and walk through the doorway to a point within the adjoining room while collecting a video of the transition between rooms.

In some embodiments, the indoor scene capture system also provides an interactive video tour of the rooms that includes displaying of transitions between rooms. The indoor scene capture system presents the video of a room by displaying the frame associated with an initial direction of view and displaying subsequent frames associated with subsequent directions of view. For example, the indoor scene capture system may present the interactive video tour to a user on the smartphone immediately after the videos have been collected by the smartphone. The indoor scene capture system may allow the user to scroll the video left or right to indicate subsequent directions from which to view a room. Alternatively, the indoor scene capture system may automatically determine the subsequent direction based on the direction of the smartphone as indicated by a gyroscope of the smartphone. When a user selects a doorway that is currently being displayed, the indoor scene capture system presents the video of the transition through that doorway and then presents the video of the adjoining room by displaying a frame associated with an initial direction and displaying subsequent frames associated with subsequent directions.

In some embodiments, the indoor scene capture system may use an inertial sensor contained within a camera device to determine the angles of rotations for the frames of a video as the camera is rotated to collect the video and may use an indication that a full rotation has been completed to counter drifts resulting from inaccuracies in the determined angles of rotation. The indoor scene capture system collects frames of the video as the camera device that is positioned in the room rotates about that position. For frames of the video, the indoor scene capture system determines an angle of rotation of the camera device at the time of the collecting of the frame. The angle of rotation may be determined by an inertial sensor such as a gyroscope. The indoor scene capture system receives an indication of an ending frame that corresponds to a complete rotation. For example, the indoor scene capture system may allow a user to designate the same location in an initial frame and an ending frame. Alternatively, the indoor scene capture system may determine an initial direction of an initial frame using a magnetometer contained within the camera device and periodically determine the directions of frames until rotation back to the initial direction is detected. The indoor scene capture system may also compare the visual content of frames to the content of the initial frame to determine when a full rotation is completed. To counter inaccuracies in the angle of rotation reported by the inertial sensor, the indoor scene capture system determines a difference between the angle of rotation for the ending frame and a full rotation and then adjusts the angles of rotation for the frames to compensate for the difference. For example, if the angles of rotation indicate an incomplete rotation of 350°, then the difference would be 10°. The indoor scene capture system may add a fraction of the difference to each frame in proportion to its angle of rotation to the angle of the incomplete rotation. In such a case, a frame with an angle of rotation of 175° would be adjusted to 180°, and a frame with an angle of rotation of 350° would be adjusted to 360°.

In some embodiments, the indoor scene capture system determines a layout of a room with walls and corners from mappings of corners of the room to directions of the corners from a point within the room. The indoor scene capture system considers each corner as having a ray from the point within the room in the direction of the corner. For example, the indoor scene capture system may allow a user collecting a video of a room to mark the corners of the room by dragging a corner icon to indicate a corner in a frame currently being collected by a camera. To determine the layout, the indoor scene capture system selects a starting position along the ray of an initial corner. For example, the indoor scene capture system may select the starting position to be a unit distance from the point within the room. The indoor scene capture system then selects an initial adjacent corner that is adjacent to the initial corner. The corners at the ends of a wall are considered adjacent corners. The indoor scene capture system may then employ a search algorithm to identify a direction from the initial point that best represents the actual direction of the wall between the initial corner and the initial adjacent corner, assuming that all the corners are right angles. The search algorithm may assume different directions (e.g., 0° to 360° in 0.5° increments), generate a score for each direction rating how well that direction represents the actual direction, and select the direction with the highest rating at the best direction. For each of the directions, the indoor scene capture system determines a position along the ray of the initial adjacent corner assuming the wall between the initial corner and the initial adjacent corner is in that direction. For each of the remaining corners in order of adjacency until a position is calculated along the ray of the initial corner, the indoor scene capture system calculates a position along the ray of the next adjacent corner, assuming the walls are at right angles. The indoor scene capture system then calculates a difference between the initial position and the calculated position along the ray of the initial corner. The indoor scene capture system may use that difference as the score. After generating a score for each direction, the indoor scene capture system selects the positions of the corners associated with the direction with the smallest difference as the layout of the room.

In some embodiments, the indoor scene capture system determines dimensions of a layout of a room having walls based on distances from a point within the room to the corners as calculated by triangulation based on a video of the room. For each corner of the room, the indoor scene capture system provides mappings of locations of that corner within multiple adjacent frames of the video. For example, as a user collects the video, the indoor scene capture system allows the user to mark the location of each corner on one or more frames of the video and then stores the mappings of locations to corners. If the user marks a corner in only one frame, the scene capture system automatically determines the location of that corner in another frame using image analysis. The indoor scene capture system then calculates a triangulated distance from the point in the room to that corner using triangulation based on the mappings and the directions of the frame. Because the camera rotates in a circle about the point as the user holding the camera rotates, a parallax is introduced into the frames from which the distance to the corners can be triangulated. The indoor scene capture system selects a scale for the room by minimizing the differences between the triangulated distances and calculated distances, assuming that scale. The indoor scene capture system calculates the dimensions of the walls of the room, assuming the selected scale.

In some embodiments, the indoor scene capture system aligns layouts of adjoining rooms connected via a doorway. Each doorway has a left and right edge. The indoor scene capture system translates the layout of a room so that an edge of the doorway is coincident with the same edge of the doorway in the layout of the other room. After the corresponding edges are coincident, the indoor scene capture system rotates the layout of a room so that the common wall in the layout of the room is coincident with the common wall in the layout of the other room. The indoor scene capture system may also scale one of the rooms based on the difference in location of the non-coincident edges of the doorway. For example, if the width of the doorway in one layout is 90% of the width of the doorway in the other layout, the indoor scene capture system scales the dimensions of the layout by 10/9 so that the widths of the doorways are the same in both layouts.

In some embodiments, to capture a video tour using a smartphone containing the indoor scene capture system, the user stands near the center of a room, holding the smartphone upright and aiming the phone camera at a wall. The user then proceeds to rotate 360° to capture or collect a video of the entire room. The indoor scene capture system may automatically detect when a full rotation has been completed (e.g., using a magnetometer) or may prompt the user to mark a location on the smartphone display corresponding to the initial starting point. The indoor scene capture system then prompts the user to turn and face the next room. Once in position, the user indicates that the user is ready to move to the next room by performing a swipe-up gesture and subsequently proceeds to walk to the next room. The indoor scene capture system records this transition as a video. On reaching the center of the next room, the user performs a swipe-down gesture and begins to capture the current room. The same process is repeated for every room. If a room is revisited, the indoor scene capture system allows the user to indicate this room as being revisited. The indoor scene capture system represents captured rooms as thumbnails on the bottom of the smartphone display.

Once capture is complete, the indoor scene capture system may allow a user to view a virtual tour of the scene. For each room, the indoor scene capture system generates a 360° video panorama, in which the user may pan left or right to explore the scene. The indoor scene capture system provides two modes for interacting with the panorama. With the first mode, the user may drag left or right on the touch screen or physically move the device in 3D space to "look around" the room. When a door appears in the currently displayed frame, the indoor scene capture system displays a motion arrow, indicating that there is a path leading to an adjoining room. Upon tapping the arrow, the indoor scene capture system plays back a transition video, giving the user the effect of "walking" into the adjoining room. At the end of the transition, the indoor scene capture system presents the 360° video panorama of the current room and allows the user to explore that room interactively.

The indoor scene capture system may allow a user to embed close-up photographs and text in the scene during playback. To add an embedded object, the user double-taps a point of interest on the smartphone display. The indoor scene capture system then displays a modal dialog that prompts the user to take a high-resolution photograph of the point of interest and optionally add some descriptive text. Upon completing this task and closing the dialog, the indoor scene capture system returns the user to the tour, and the embedded object now appears as an icon overlaid on top of the panorama. The indoor scene capture system positions the icon at the location where the user originally performed the double-tap gesture and pins the icon to that location as the user pans left or right. When the user taps the icon, the indoor scene capture system displays a modal popup that shows the photograph along with the annotation text. The indoor scene capture system saves the embedded objects with the virtual tour data for future viewing.

The indoor scene capture system may allow the user to mark room features (e.g., corners where two walls meet or the left and right edges of doorways) either in real time during video capture or later during playback. As a video is being captured, the indoor scene capture system provides icons for use in marking room features that are in view. To mark a corner, the user drags a corner icon (e.g., with a vertical bar) so that it is aligned with the corner. To mark a doorway, the user drags a doorway icon (e.g., with two vertical bars that are moveable) so that the edges of the doorway icon are aligned with the edges of the doorway. During playback, the indoor scene capture system may allow the user to mark the room features in a similar manner. The indoor scene capture system allows the user to specify the rooms that are connected by a doorway by tapping on a thumbnail representation of the adjoining room.

The indoor scene capture system employs an optimization algorithm that uses the corner and doorway information and other room constraints to generate a 2D floor plan or layout of the space. The indoor scene capture system determines the layout of each room based on the marked corners. The indoor scene capture system then employs a triangulation algorithm based on parallax in the captured video to calculate the distance from the point of video capture (e.g., center of a room) to each corner of the room. To enable this triangulation, the user may specify the location of each corner on multiple frames of the video of a room. The indoor scene capture system then calculates the length of each wall based on the distances to the corners. To align the individual rooms to one another, the indoor scene capture system aligns the doorways connecting adjoining rooms. The indoor scene capture system may provide a user interface to allow the user to correct any alignment errors. To fix an alignment error, the user first taps a wall that requires realignment and next taps a wall to which the previously selected wall should be aligned. The indoor scene capture system displays the floor plan and indicates the user's current position in the video tour. The indoor scene capture system may also generate a 3D floor plan by extruding the 2D floor plan vertically and rendering a 3D model of the scene. The indoor scene capture system allows a user to rotate the 3D model in the x, y, and z directions.

In some embodiments, the indoor scene capture system captures an indexed video of a room using a smartphone that includes an inertial sensor (e.g., gyroscope) and magnetometer. The indoor scene capture system indexes each frame of the video with its direction (e.g., with north being 0° and south being 180°). During a video tour, the indoor scene capture system uses indexed direction information to retrieve and display the appropriate frames. To capture the camera direction, the indoor scene capture system uses the magnetometer to identify true north. Since the magnetometer has a relatively low resolution and refresh rate, the indoor scene capture system uses a gyroscope to determine angles of rotation from the start of capture of a room to the end of the capture. The indoor scene capture system also uses an accelerometer to determine the direction of gravitational acceleration and thus the major axis orientation (i.e., portrait versus landscape) of the smartphone. Once the major axis is determined, the indoor scene capture system determines the camera direction as represented by the following equation:

$$\theta_t^G = \theta_{t-1}^G + \Delta t \times \omega^{majoraxis} \quad (1)$$

where $\theta_t^G$ represents the current angle of rotation as calculated by adding the delta change in angle of rotation $\Delta t \times \omega^{majoraxis}$ as reported by the gyroscope to the last known angle of rotation $\theta_{t-1}^G$. The indoor scene capture system may update the direction at approximately 100 Hz. The direction, however, suffers from gyroscopic drift of as much as ±10° in a full 360° rotation. The indoor scene capture system then indexes the current frame with the calculated direction.

To counter the gyroscopic drift, the indoor scene capture system uses the magnetometer to identify when a full rotation has been completed. Although the intermediate magnetometer readings are noisy and not particularly useful for updating camera direction, the resolution may be sufficient to indicate when a full rotation has been completed. The indoor scene capture system may also identify completion of rotation using other mechanisms. For example, the indoor scene capture system may allow the user to specify a starting point on an initial frame and designate that starting point on an ending frame. The indoor scene capture system may also compare the content of the frames to match an initial frame with an ending frame. The indoor scene capture system counters for the gyroscopic drift by uniformly distributing the difference between the gyroscopic-indicated direction of the final frame and the magnetometer-indicated direction of the final frame among the frames of the video.

During the video capture, the indoor scene capture system allows a user to mark room features such as corners and doors. Once a corner is marked, the direction of each marker is calculated from the indicated x-coordinate of the marker within a frame by the following equation:

$$\theta_{marker} = \theta_t^G + fov/w_{img} \times (P_{marker} - w_{img}/2) \quad (2)$$

The spatial index $\theta_t^G$ of the frame on screen corresponds to the direction of the center of the frame. The indoor scene capture system calculates the one-dimensional pixel-offset of the marker from the center of the frame of width $w_{img}$ by subtracting the position of the center pixel $w_{img}/2$ from the position of the marker $P_{marker}$. The indoor scene capture system then converts the pixel offset into a direction offset by multiplying the field of view of the image fov and dividing by the total pixel width $w_{img}$. The indoor scene capture system estimates the direction of the marker $\theta_{marker}$ by adding the direction offset to the current spatial index $\theta_t^G$. During video tour playback, the indoor scene capture system calculates the position $P_{feature}$ of a room feature with a known direction $\theta_{feature}$ according to the following equation:

$$P_{feature} = w_{img}/2 + w_{img}/fov \times (\theta_{feature} - \theta_t^G) \quad (3)$$

Knowledge of the position of a feature element allows the indoor scene capture system to embed user interface elements such as motion arrows for transitioning from one room to the next and annotations into the scene.

To determine the layout of a room, the indoor scene capture system treats corners and doors as rays emanating from the camera center and reconstructs the room geometry that fits the given set of rays based on the following assumptions. First, the indoor scene capture system assumes that the scene satisfies the Manhattan world assumption, that is, the walls are planar and the room corners are at right angles. The indoor scene capture system also assumes that the camera is located in a position within the room from which all corners are visible, or if this is not possible, that the user is able to estimate and mark the location of an occluded room feature.

Figure 1B:
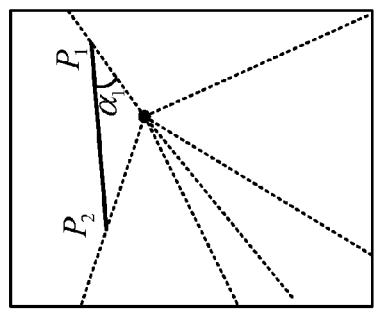
FIG. 1B illustrates a hypothesized wall.
Figure 1C:
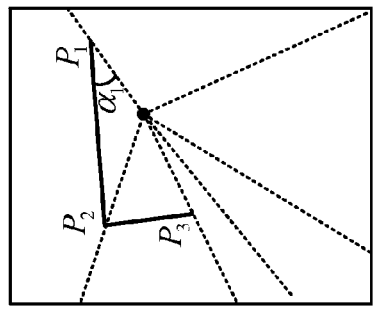
FIG. 1C illustrates a wall rotated 90 degrees.
Figure 1D:
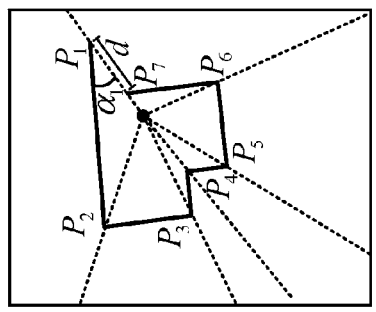
FIG. 1D illustrates an incorrect hypothesis.
Figure 1E:
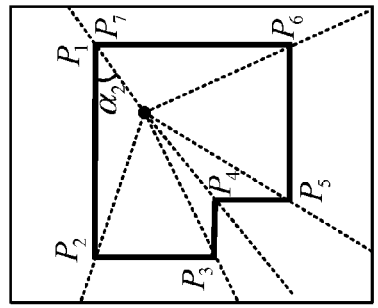
FIG. 1E illustrates an optional wall configuration.

The indoor scene capture system employs a search algorithm to identify possible layouts for a room and then selects the best layout. FIGS. 1A-1E illustrate the search algorithm. The search algorithm assumes the camera is located at the scene origin and an initial corner is at a unit distance $P_1$ from the origin, as illustrated by FIG. 1A. The indoor scene capture system selects an angle α relative to the initial corner ray (i.e., the ray from the origin in the direction of the corner), as illustrated by FIG. 1B. The search algorithm calculates the position $P_2$ of the next adjacent corner as the intersection of the ray from $P_1$ at angle α and the ray of the next adjacent corner. The search algorithm calculates the position $P_3$ of the next adjacent corner as the intersection of a ray at a right angle from the wall between $P_1$ and $P_2$ and the ray of the next adjacent corner, as illustrated by FIG. 1C. The search algorithm repeats this process for each subsequent adjacent corner until the ray of the initial corner is intersected as illustrated by FIG. 1D. The search algorithm then determines the difference between the initial position $P_1$ and the final position $P_7$ along the ray of the initial corner, as illustrated by FIG. 1E. This difference represents a rating of how well the layout based on angle α represents the actual layout of the room. The search algorithm repeats this process for different angles such as every 0.5° between 0° and 360°. The search algorithm then selects the layout with the minimum difference as best representing the actual layout of the room.

| Figure | Description |
| --- | --- |
| 1A | Top-down view of the scene showing the corner rays (dotted) emanating from the camera. $P_1$ is unit distance from camera along first ray. |
| 1B | Hypothesized wall at angle $\alpha_1$ intersects second ray at $P_2$. |
| 1C | The next wall is rotated 90 degrees, and intersects at $P_3$. |
| 1D | Incorrect hypothesis results in a distance error d between first and last points. |
| 1E | Optimal wall configuration with starting wall angle $\alpha_2$, minimizes d. |

Figure 2A:
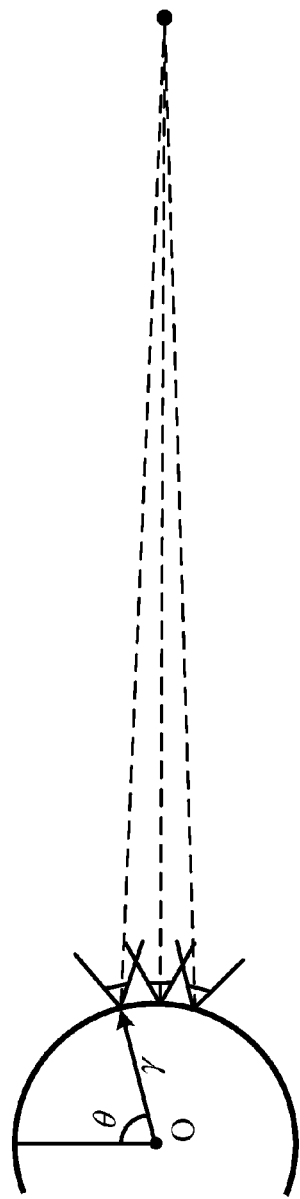
FIG. 2A illustrates a camera motion model as a user rotates to collect a video of a room.

The indoor scene capture system then determines the dimensions of the walls of the room based on distances from the origin to the corners as determined by the parallax of the frames that include a corner. Since a user holds the camera and then performs a complete rotation to capture the video of a room, the distance of the camera from the center of rotation results in a significant motion parallax in the frames. FIG. 2A illustrates a camera motion model as a user rotates to collect a video of a room. The camera is at a radius r from the center of rotation O with a direction θ. The point on a frame corresponding to point P(X, Y, Z) is represented by the following equation:

$$p = \begin{bmatrix} u \\ v \\ w \end{bmatrix} = K[I\ 0]TP = \begin{bmatrix} \alpha & s & u_0 \\ & \beta & v_0 \\ & & 1 \end{bmatrix} \begin{bmatrix} 1 & 0 & 0 & 0 \\ 0 & 1 & 0 & 0 \\ 0 & 0 & 1 & 0 \end{bmatrix} \begin{bmatrix} R & t \\ 0 & 1 \end{bmatrix} \begin{bmatrix} X \\ Y \\ Z \\ T \end{bmatrix} \quad (4)$$

where $$R = \begin{bmatrix} \cos\theta & 0 & \sin\theta \\ 0 & 1 & 0 \\ -\sin\theta & 0 & \cos\theta \end{bmatrix} \quad t = \begin{bmatrix} 0 \\ 0 \\ -r \end{bmatrix}$$

The camera may be calibrated once using a variety of well-known calibration tools to generate the intrinsic parameters of the camera.

Figure 2B:
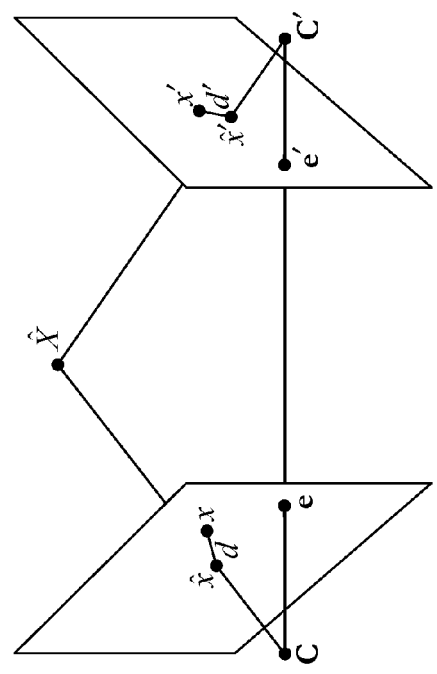
FIG. 2B illustrates the triangulation of a distance to a corner.

FIG. 2B illustrates the triangulation of a distance to a corner. The indoor scene capture system uses the corner correspondences x and x' and camera matrices P and P' to triangulate the point $\hat{X}$ that minimizes the cost function as represented by the following equation:

$$\min \sum_{i=1}^{n} d(x, \hat{x}) + d(x', \hat{x}') \quad (5)$$

Subject to $\hat{x} = P\hat{X}$ and $\hat{x}' = P'\hat{X}$ where d (x, $\hat{x}$) represents the Euclidean distance between known corner x and predicted projection $\hat{x}$ of the 3D point. The cost function is also referred to as a reprojection error, that is, the sum of the distances between the projections of the 3D point and its corresponding 2D corner. By minimizing the reprojection error, the indoor scene capture system ensures that the 3D point satisfies all the major camera projections as well as possible. The indoor scene capture system may employ a linear convex optimization to determine a minimum reprojection error. Because of the noise in the captured data, the indoor scene capture system may account for the noise in the distance of the camera from the center of the room and angle of rotation by the camera matrix P as represented by the following equation:

$$P = K \begin{bmatrix} \cos(\theta + \Delta\theta) & 0 & \sin(\theta + \Delta\theta) \\ 0 & 1 & 0 \\ -\sin(\theta + \Delta\theta) & 0 & \cos(\theta + \Delta\theta) \end{bmatrix} \begin{bmatrix} 0 \\ 0 \\ -r + \Delta r \end{bmatrix} \quad (6)$$

where Δr represents the noise in the radius and Δθ represents the noise in the angle of rotation. In some embodiments, the indoor scene capture system may use the Levenberg-Marquardt algorithm, which iteratively searches a trust region for feasible minimum solutions. (Nocedal, J., and Wright, S. J., "Numerical Optimization," Springer Series in Operations Research, Springer-Verlag, New York, N.Y., 1999.) The indoor scene capture system then applies a Manhattan constraint to the resulting geometry to alleviate any errors in the reconstruction.

The indoor scene capture system then aligns the rooms based on the marked doorways between adjoining rooms. Once the layout of each room has been determined, the indoor scene capture system determines the coordinates of a doorway by intersecting the doorway rays with the walls. The indoor scene capture system then calculates a 2D rigid body transformation to align the doorways between adjoining rooms as represented by the following equation:

$$\begin{pmatrix} x'_i \\ y'_i \end{pmatrix} = \begin{pmatrix} c & -s \\ s & c \end{pmatrix} \begin{pmatrix} x_i \\ y_i \end{pmatrix} + \begin{pmatrix} t_x \\ t_y \end{pmatrix} \quad (7)$$

where c, s, $t_x$, and $t_y$ are unknowns. By substituting the values of corresponding doors in adjoining rooms, the indoor scene capture system solves for the transformation that correctly aligns the doorways and hence also aligns the rooms. The matrix equation can be solved by a standard least square fitting method.

Figure 3:
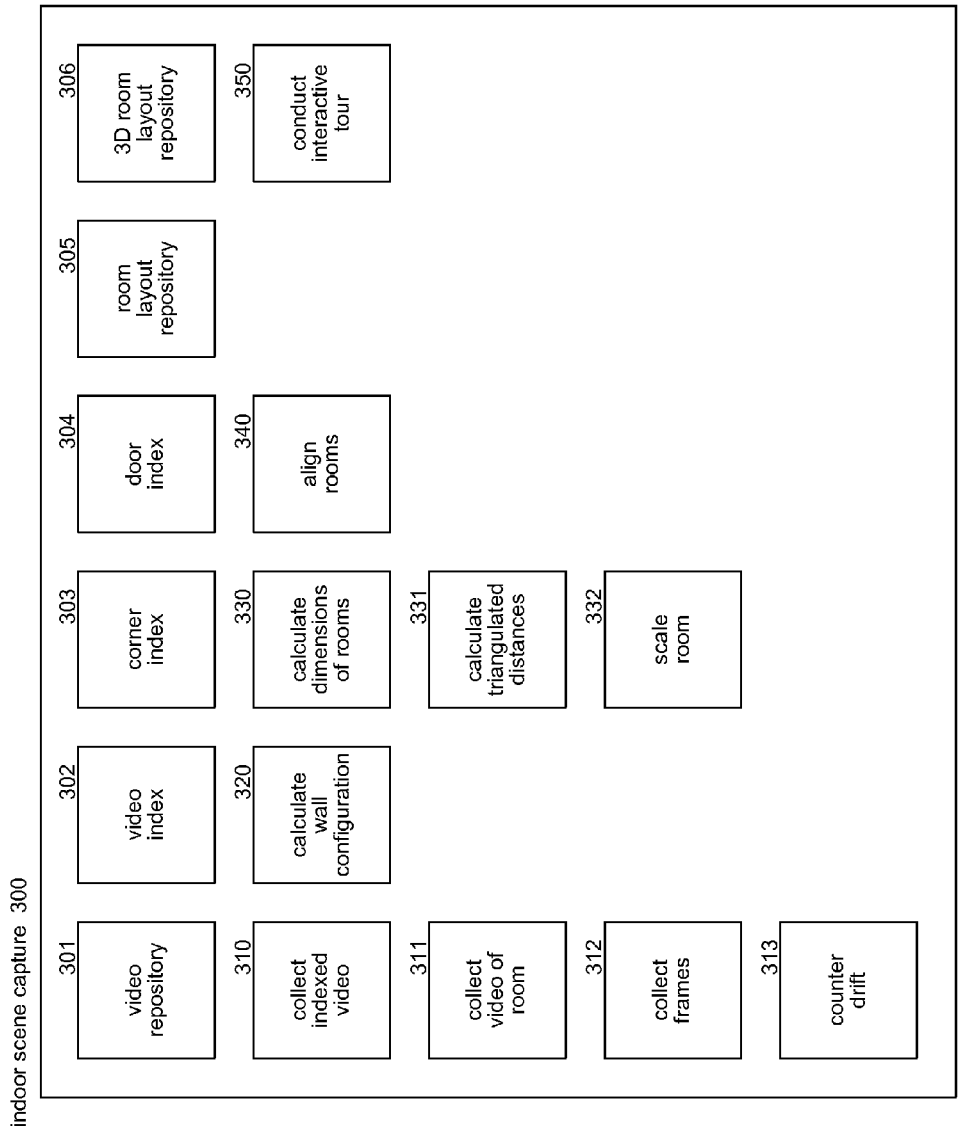
FIG. 3 is a block diagram that illustrates components of the indoor scene capture system in some embodiments.

FIG. 3 is a block diagram that illustrates components of the indoor scene capture system in some embodiments. The indoor scene capture system 300 includes a video repository 301, a video index 302, a corner index 303, a door index 304, a room layout repository 305, and a 3-D room layout repository 306. The video repository contains the frames of the videos for each room and the transition videos from room to room. The video index maps directions to the corresponding frames in the videos of the rooms. The corner index identifies the location of a corner in frames of the videos of the rooms. The door index identifies the location of the doors within the frames of the videos of the room, which may include the location of each edge of a door. The room layout repository contains the layout of each room. The 3D room layout repository contains the layout of each room in 3D.

The indoor scene capture system also includes a collect indexed video component 310, a calculate wall configuration component 320, a calculate dimensions of rooms component 330, an align rooms component 340, and a conduct interactive tour component 350. The collect indexed video component collects a spatially indexed video by invoking a collect video of room component 311, a collect frames component 312, and a counter drift component 313. The calculate wall configuration component calculates the configuration of a room based on the corner rays. The calculate dimensions of rooms component calculates the dimensions based on triangulation of the corner rays and invokes a calculate triangulated distances component 331 and a scale room component 332. The align rooms component aligns the rooms based on the location of the doorways between adjoining rooms. The conduct interactive tour component 350 plays back an interactive version of the video from the video repository.

The computing devices and systems on which the indoor scene capture system may be implemented may include a central processing unit, input devices, output devices (e.g., display devices and speakers), storage devices (e.g., memory), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include handheld devices such as laptops, tablets, e-readers, personal digital assistants, smartphones, gaming devices, and so on. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the indoor scene capture system. The data transmission media is used for transmitting data via transitory, propagating signals or carrier waves (e.g., electromagnetism) via a wired or wireless connection.

The indoor scene capture system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments.

Figure 4:
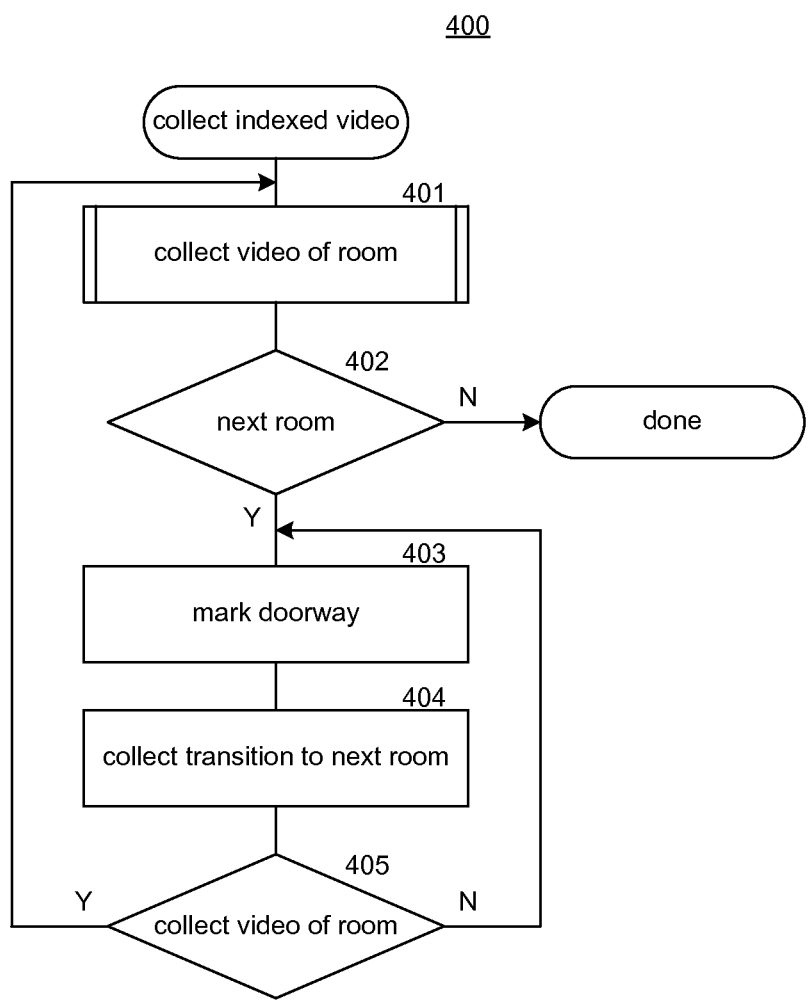
FIG. 4 is a flow diagram that illustrates the processing of the collect indexed video component of the indoor scene capture system in some embodiments.

FIG. 4 is a flow diagram that illustrates the processing of the collect indexed video component of the indoor scene capture system in some embodiments. The collect indexed video component 400 loops collecting the video of each room and collecting the transition video between adjoining rooms. In block 401, the component invokes the collect video of room component to collect the video of a room. In decision block 402, if there are more rooms for which to capture a video, then the component continues at block 403, else the component completes. In block 403, the component allows the user to mark the doorway leading to the next room. When collecting the video, the user may indicate a doorway leading to the next room with a swipe gesture in the direction of the doorway. The component may allow the user to mark the edges of the doorway during collection or later during playback. In block 404, the component optionally collects the transition video to the next room. In decision block 405, if the user indicates to collect the video of the current room and the video has not already been collected, then the component loops to block 401, else the component loops to block 403.

Figure 5:
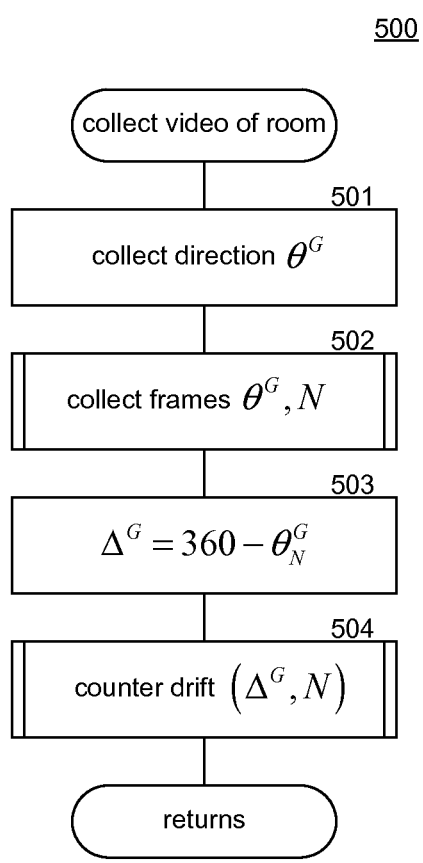
FIG. 5 is a flow diagram that illustrates the processing of a collect video of room component of the indoor scene capture system in some embodiments.

FIG. 5 is a flow diagram that illustrates the processing of a collect video of room component of the indoor scene capture system in some embodiments. The collect video of room component 500 is invoked to collect a video of a room, and it stores the video in the video repository and stores the indexing information in the video index, the corner index, and the door index. In block 501, the component collects the direction of the camera using the magnetometer. In block 502, the component invokes the collect frames component to collect the frames of the video as the user rotates to capture the video of the room. In block 503, the component determines the drift resulting from the difference between the angle of rotation, as determined based on the gyroscope at the point of the complete rotation, and 360°. In block 504, the component invokes the counter drift component to counter the drift resulting from the gyroscope, and the component then returns.

Figure 6:
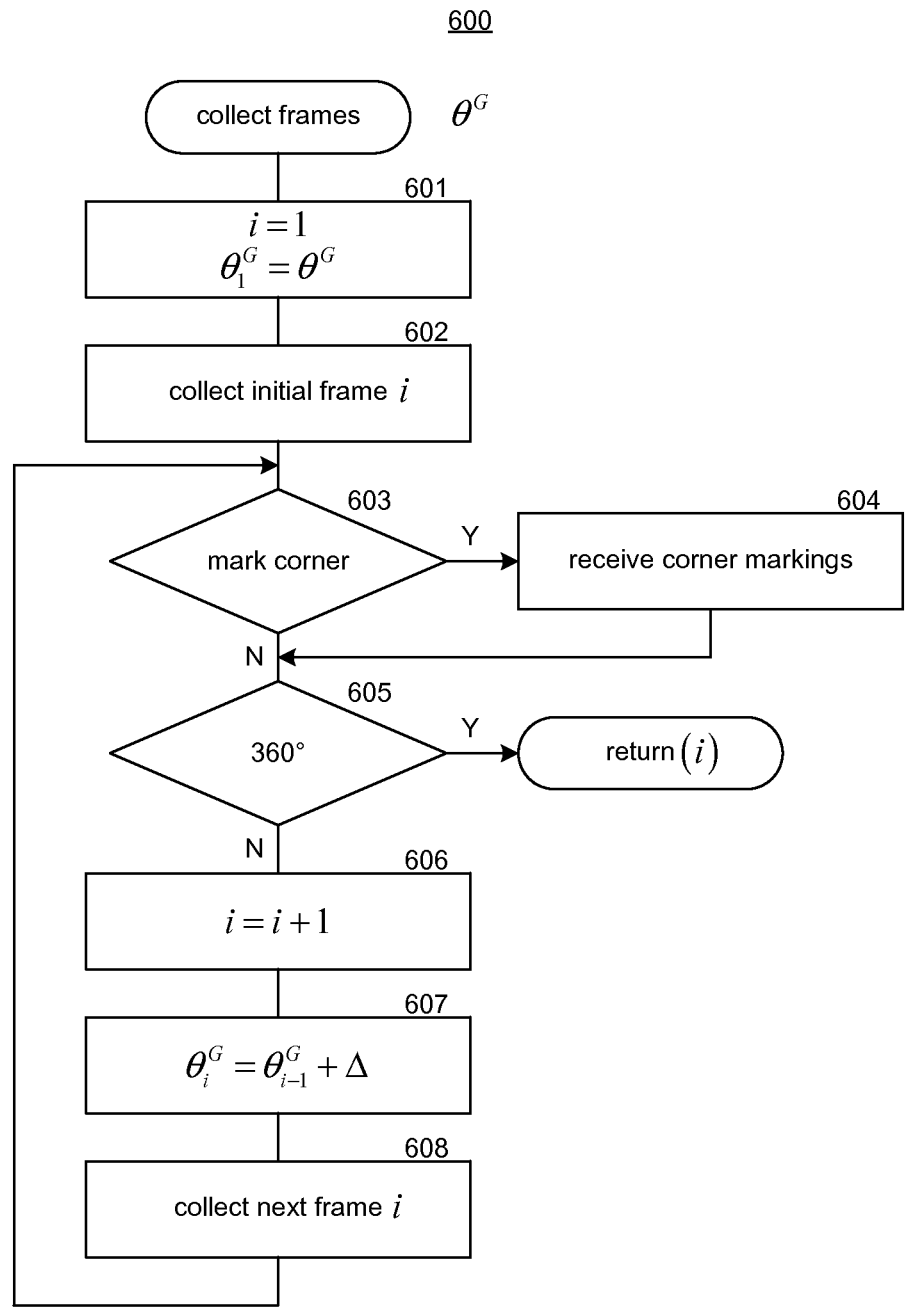
FIG. 6 is a flow diagram that illustrates the processing of a collect frames component of the indoor scene capture system in some embodiments.

FIG. 6 is a flow diagram that illustrates the processing of a collect frames component of the indoor scene capture system in some embodiments. The collect frames component 600 collects the frames of the video as a user rotates within a room and determines the angle of rotation based on the gyroscope. In block 601, the component initializes a frame counter and the direction for the initial frame. In block 602, the component collects the initial frame. In decision block 603, if the user indicates to mark a corner of the collected frame, then the component receives the corner marking in block 604. In decision block 605, if a full rotation has been completed, then the component returns a count of the frames collected, else the component continues at block 606. In block 606, the component increments to the next frame. In block 607, the component sets the direction for the next frame by incrementing the direction of the previous frame by the difference in angle of rotation from the previous frame. In block 608, the component collects the next frame and loops to block 603.

Figure 7:
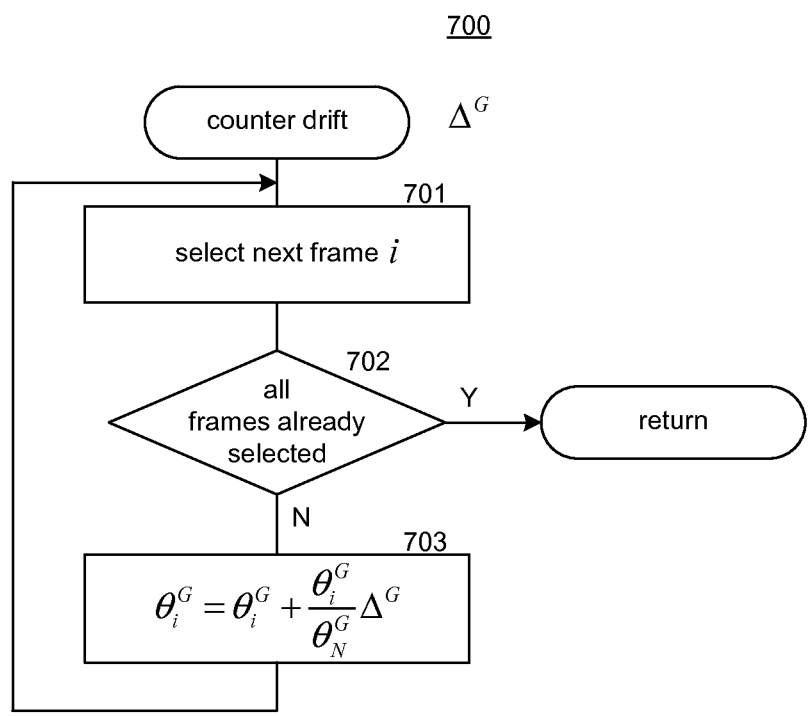
FIG. 7 is a flow diagram that illustrates the processing of a counter drift component of the indoor scene capture system in some embodiments.

FIG. 7 is a flow diagram that illustrates the processing of a counter drift component of the indoor scene capture system in some embodiments. The counter drift component 700 uniformly distributes the gap between a full rotation and the angle of rotation as determined by the gyroscope. In block 701, the component selects the next frame starting with the first frame. In decision block 702, if all the frames have already been selected, the component returns, else the component continues at block 703. In block 703, the component adjusts the direction for the selected frame based on the ratio of the direction of that frame to the direction of the last frame collected as indicated by the gyroscope. The component then loops to block 701 to select the next frame.

Figure 8:
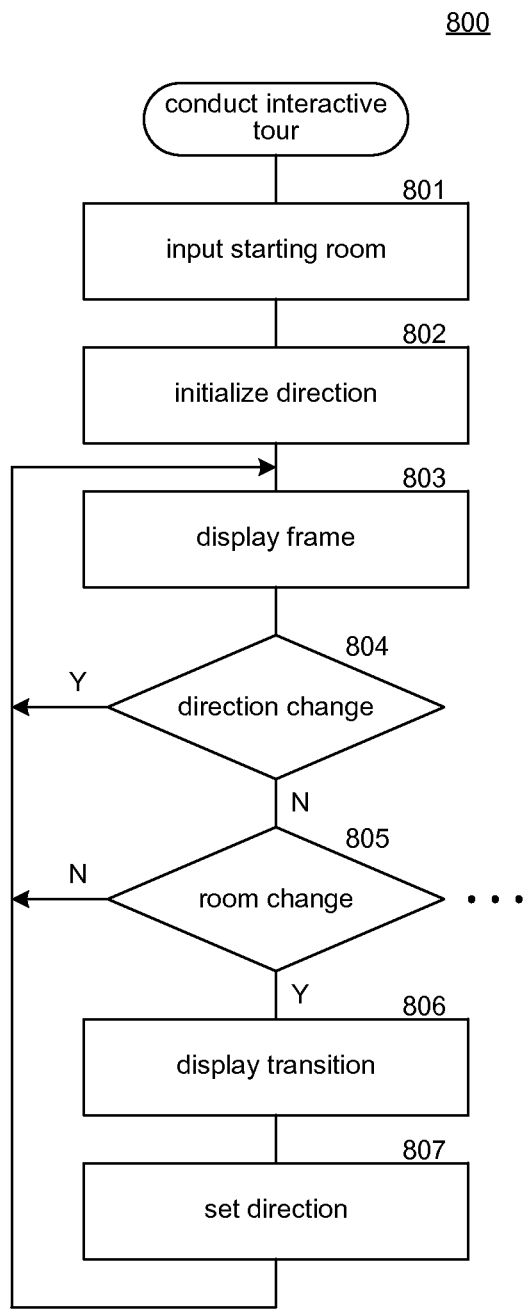
FIG. 8 is a flow diagram that illustrates the processing of a conduct interactive tour component of the indoor scene capture system in some embodiments.

FIG. 8 is a flow diagram that illustrates the processing of a conduct interactive tour component of the indoor scene capture system in some embodiments. The conduct interactive tour component 800 displays a video of rooms and the transitions between rooms. In block 801, the component inputs an indication of the starting room. In block 802, the component initializes the direction of view to the direction of the starting room. In block 803, the component displays the frame associated with the current direction. In decision block 804, if the direction has changed, then the component loops to block 803 to display the frame associated with the new direction, else the component continues at block 805. In block 805, if the user indicates to change rooms, then the component continues at block 806, else the component loops to block 803. In block 806, the component displays the transition video between the rooms. In block 807, the component sets the direction for the new room and then loops to block 803 to display the frames of the new room.

Figure 9:
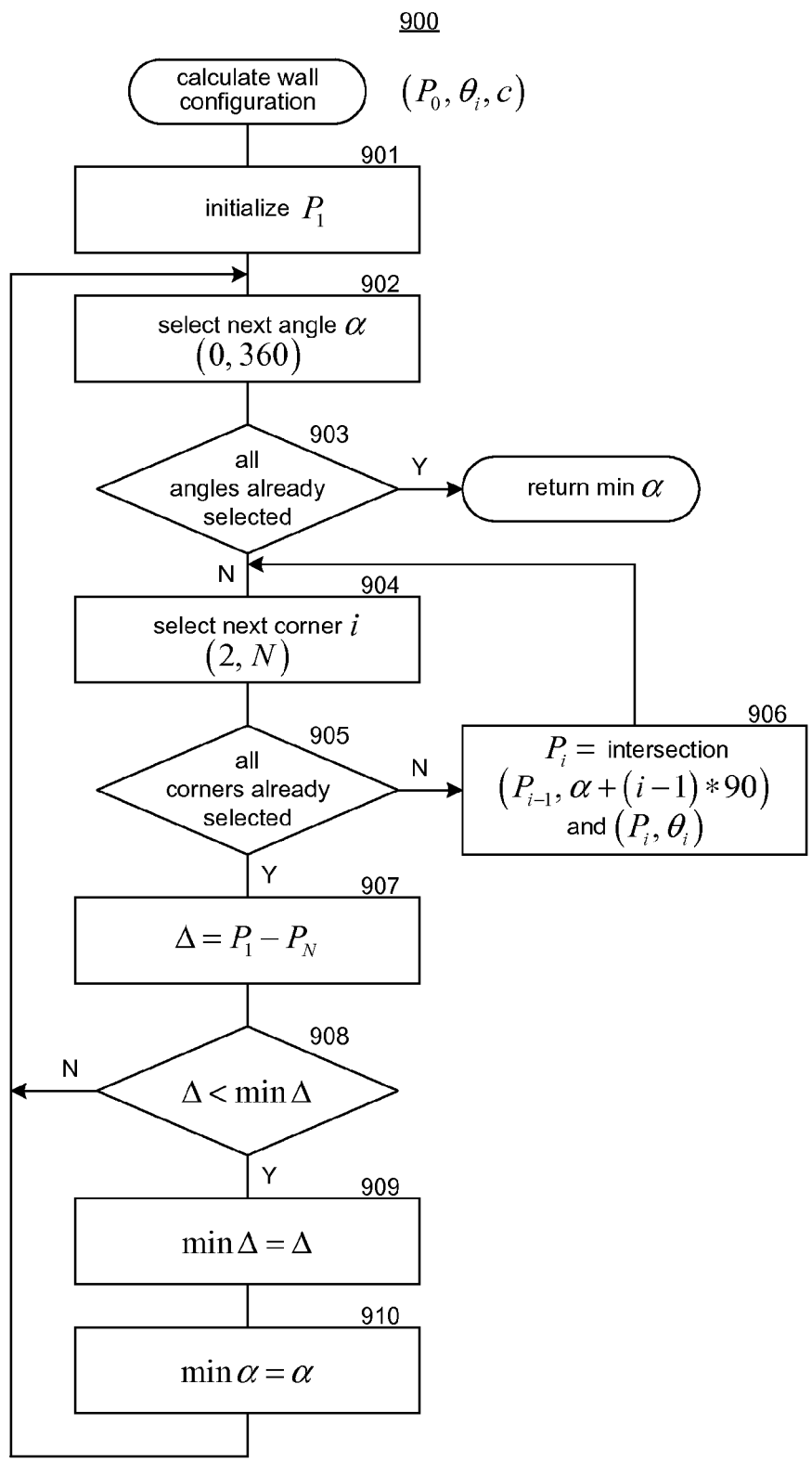
FIG. 9 is a flow diagram that illustrates the processing of a calculate wall configuration component of the indoor scene capture system in some embodiments.

FIG. 9 is a flow diagram that illustrates the processing of a calculate wall configuration component of the indoor scene capture system in some embodiments. The calculate wall configuration component 900 implements a search algorithm that finds the angle relative to the ray of the initial corner that represents the best room layout, assuming the walls are at right angles. In block 901, the component initializes a point on the ray of the initial corner. In blocks 902-910, the component loops selecting different angles about the initial point and scoring the layout, assuming that the wall extends at that angle from the initial point. In block 902, the component selects the next angle, such as angles between 0° and 360° in 0.5° increments. In decision block 903, if all the angles have been selected, then the component returns the angle associated with the minimum score, else the component continues at block 904. In blocks 904-906, the component loops selecting each next corner and calculating the intersection of a wall extending from that corner at 90°. In block 904, the component selects the next corner. In decision block 905, if all the corners have already been selected, then the component continues at block 907, else the component continues at block 906. In block 906, the component calculates the position of the corner based on the intersection of a ray from the previous corner that intersects the ray of the selected corner. The component then loops to block 904. In block 907, the component calculates the difference between the initial position along the ray of the initial corner and the final position along the ray of the initial corner. In decision block 908, if the difference is less than the minimum difference calculated so far, then the component continues at block 909, else the component loops to block 902. In block 909, the component resets the minimum difference. In block 910, the component records the angle of the minimum difference and then loops to block 902 to select the next angle.

Figure 10:
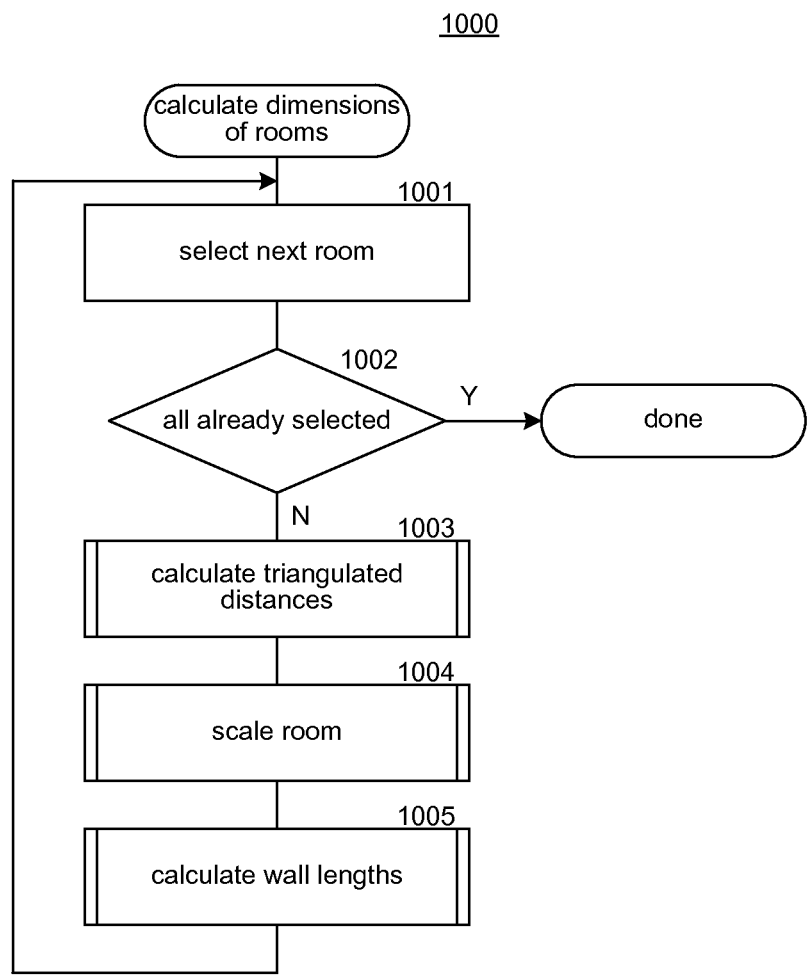
FIG. 10 is a flow diagram that illustrates the processing of a calculate dimensions of rooms component of the indoor scene capture system in some embodiments.

FIG. 10 is a flow diagram that illustrates the processing of a calculate dimensions of rooms component of the indoor scene capture system in some embodiments. The calculate dimensions of rooms component 1000 calculates the dimension of each room based on triangulated distances to the corners of the rooms. In block 1001, the component selects the next room. In decision block 1002, if all the rooms have already been selected, then the component completes, else the component continues at block 1003. In block 1003, the component invokes the calculate triangulated distances component to calculate the triangulated distances to the corners of the selected room. In block 1004, the component invokes a scale room component to scale the dimensions of the selected room based on the triangulated distances to the corners. In block 1005, the component calculates the wall lengths of the scaled room based on the scale and then loops to block 1001 to select the next room.

Figure 11:
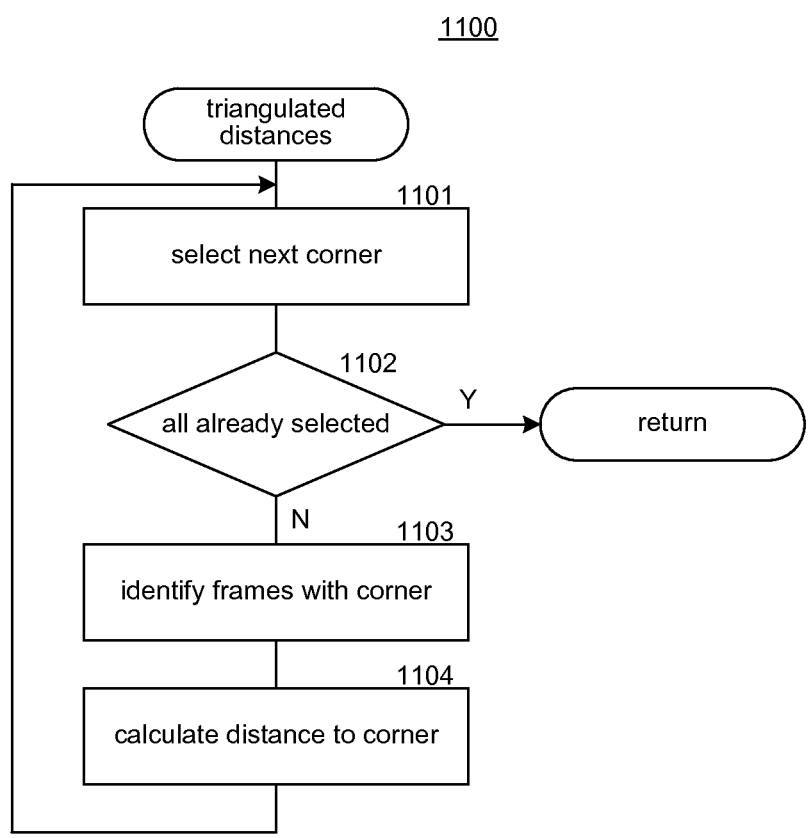
FIG. 11 is a flow diagram that illustrates the processing of a calculate triangulated distances component of the indoor scene capture system in some embodiments.

FIG. 11 is a flow diagram that illustrates the processing of a calculate triangulated distances component of the indoor scene capture system in some embodiments. The calculate triangulated distances component 1100 selects each corner and calculates the distance from the center of rotation of the video capture based on triangulation determined by the parallax of the collected frames that included that corner. In block 1101, the component selects the next corner. In decision block 1102, if all the corners have already been selected, the component returns, else the component continues at block 1103. In block 1103, the component identifies frames that contain the selected corner. In block 1104, the component calculates a distance to the selected corner based on triangulation and then loops to block 1101 to select the next corner.

Figure 12:
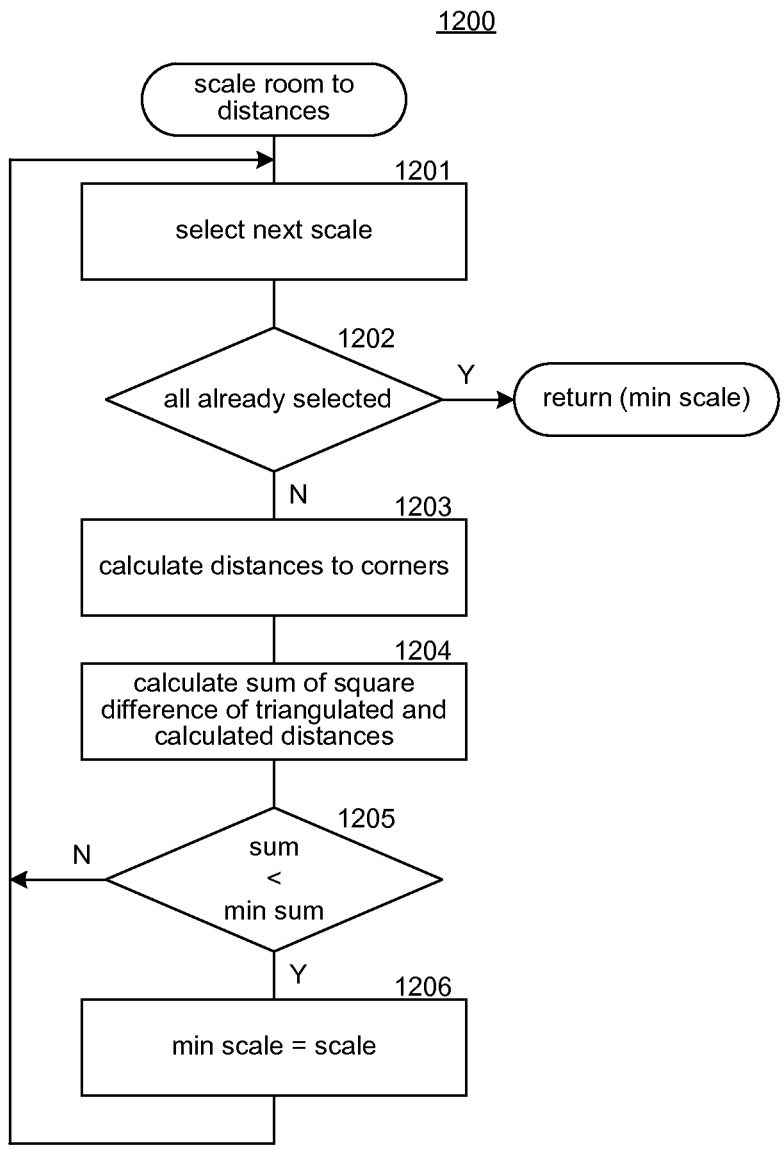
FIG. 12 is a flow diagram that illustrates the processing of a scale room to distances component of the indoor scene capture system in some embodiments.

FIG. 12 is a flow diagram that illustrates the processing of a scale room to distances component of the indoor scene capture system in some embodiments. The scale room to distances component 1200 searches for a scale that results in the minimum difference between the triangulated distances and the calculated distances based on that scale. In block 1201, the component selects the next scale. In decision block 1202, if all the scales have already been selected, then the component returns the minimum scale, else the component continues at block 1203. In block 1203, the component calculates the distances to the corners, assuming the selected scale. In block 1204, the component calculates the sum of the square of the differences between the triangulated distances and the calculated distances. In decision block 1205, if the sum of the score of the differences is less than the minimum sum calculated so far, then the component continues at block 1206, else the component loops to block 1201 to select the next scale. In block 1206, the component sets the scale with the minimum sum to the selected scale and then loops to block 1201 to select the next scale.

Figure 13:
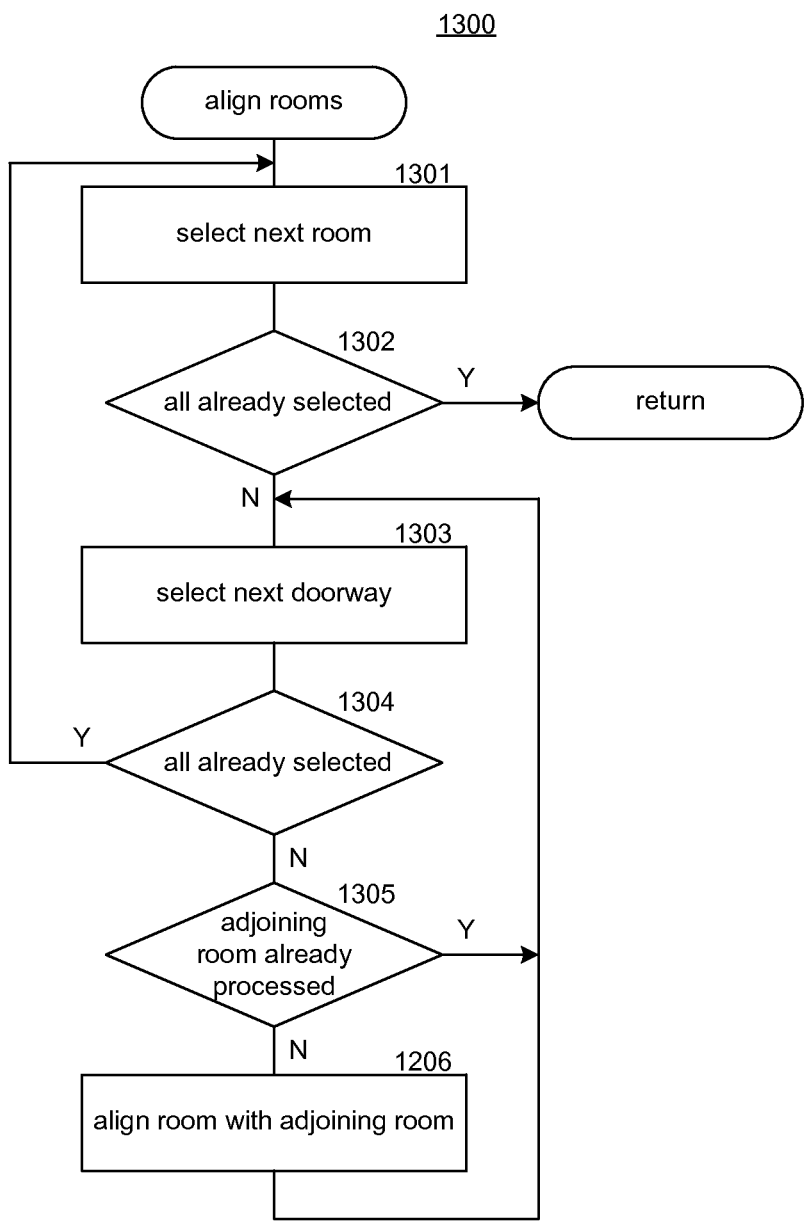
FIG. 13 is a flow diagram that illustrates the processing of an align rooms component of the indoor scene capture system in some embodiments.

FIG. 13 is a flow diagram that illustrates the processing of an align rooms component of the indoor scene capture system in some embodiments. The align rooms component 1300 loops selecting each room and aligning the adjoining rooms based on the positions of the doorways. In block 1301, the component selects the next room, starting with the first. In decision block 1302, if all the rooms have already been selected, then the component completes, else the component continues at block 1303. In block 1303, the component selects the next doorway of that room. In decision block 1304, if all the doorways have already been selected, then the component loops to block 1301 to select the next room, else the component continues at block 1305. In decision block 1305, if the adjoining room has already been processed, then the component loops to block 1303 to select the next doorway, else the component continues at block 1306. In block 1306, the component aligns the room with the adjoining room and then loops to block 1303 to select the next doorway.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, a doorway may be considered to be any passageway between rooms even if there is no door. Also, the indoor scene capture system may be implemented on a commodity handheld device. Accordingly, the invention is not limited except as by the appended claims.

We claim:

1. A method in a handheld device with a camera for collecting a video of rooms, the method comprising:
   for each room,
   collecting a video of the room as a user holding the handheld device rotates around a point within the room and assigning directions to frames of the video as the frames are collected; and
   receiving from the user an indication of locations of corners of the room and doorways within the frames of the video as the frames are collected; for each doorway between a first room and a second room, collecting a video of the doorway as the user moves from the point within the first room through the doorway to a point within the second room; and generating a layout of the rooms based on the collected video of the rooms and the locations of the corners of the rooms and the doorways with in the frames of the video, wherein the generating of the layout is based on walls of a room that meet at a corner being at a right angle.

2. The method of claim 1 wherein the handheld device is a smartphone.

3. The method of claim 1 wherein the directions are assigned based on angle of rotation as determined by an inertial sensor of the handheld device.

4. The method of claim 3 wherein the directions are adjusted to counter drift using a magnetometer of the handheld device.

5. The method of claim 4 including triangulating a distance from the point within the room to a corner of the room based on the parallax of the frames with indicated locations of corners.

6. A method in a handheld device with a camera for collecting a video of rooms, the method comprising:

for each room,
collecting a video of the room as a user holding the handheld device rotates around a point within the room and assigning directions to frames of the video as the frames are collected; and
marking doorways within the frames of the videos;

for each doorway between a first room and a second room,
collecting a video of the doorway as the user moves from the point within the first room through the doorway to a point within the second room; and
generating a layout of a room by assuming different directions of a wall from an initial position of an initial corner to an initial adjacent corner, calculating positions of corners with the corners being right angles, calculating a difference from the initial position to a final position of the initial corner, and selecting the calculated position associated with the smallest calculated difference as representing the layout of the room.

7. The method of claim 6 including aligning layouts of adjoining rooms by translating a layout of a room so that an edge of a doorway is coincident with the corresponding edge of the doorway of an adjoining room and rotating the layout of a room so that a common wall is coincident with the common wall of an adjoining room.

8. A computer-readable storage medium storing computer-executable instructions for controlling a handheld device with a camera to collect videos of rooms, the computer-executable instructions comprising instructions that:
collect a video of a room as a user holding the handheld device rotates around a point within the room;
assign directions to frames of the video as the frames are collected based on readings from an inertial sensor of the handheld device and as later adjusted based on readings of a magnetometer of the handheld device;
mark corners of the room as the frames are collected based on user input; and
generate a layout of the room based on the marked corners and directions of frames containing the marked corners based on the walls that meet at a marked corner being at a right angle.

9. The computer-readable storage medium of claim 8 further comprising instructions that collect a video as the user moves from the point within a room through a doorway indicated by the user to a point within an adjacent room.

10. The computer-readable storage medium of claim 8 further comprising instructions that align adjoining rooms based on the doorway between the adjoining rooms.

11. The computer-readable storage medium of claim 8 further comprising instructions that triangulate distances from the point within the room to each corner based on parallax resulting from frames taken from different directions.

12. A computer-readable storage medium storing computer-executable instructions for controlling a handheld device with a camera to collect videos of rooms, the computer-executable instructions comprising instructions that:
collect a video of a room as a user holding the handheld device rotates around a point within the room;
assign directions to frames of the video as the frames are collected based on readings from an inertial sensor of the handheld device and as later adjusted based on readings of a magnetometer of the handheld device;
mark corners of the room as the frames are collected based on user input;
generate a layout of the room based on the marked corners and directions of frames containing the marked corners;
triangulate distances from the point within the room to each corner based on parallax resulting from frames taken from different directions; and
scale the layout of the room to fit the triangulated distances and calculate the dimension of each wall of the room based on the scaled layout.

13. A method performed by a handheld device for determining a layout of a room with walls and corners from mappings of corners of the room to directions of the corners from a point within the room, each corner having a ray from the point in the direction of the corner, the method comprising:
selecting a starting position along the ray of an initial corner;
selecting an initial adjacent corner that is adjacent to the initial corner;
for each of a plurality of directions,
determining a position along the ray of the initial adjacent corner, assuming the wall between the initial corner and the initial adjacent corner is in that direction;
for each of the remaining corners in order of adjacency until a calculated position is calculated along the ray of the initial corner, calculating a position along the ray of the next adjacent corner, assuming the walls are at right angles; and
calculating a difference between the starting position and the calculated position along the ray of the initial corner; and
selecting the positions of the corners associated with the direction with the smallest difference as the layout of the room.

14. The method of claim 13 wherein the mappings of corners to directions of the corners are generated by:
collecting video of frames as a user holding a handheld device with a camera rotates around the point within the room;
assigning directions to the frames;
receiving an indication of the corners within the frames; and
determining the directions of the corners based on the directions of the frames with the indicated corners.

15. A method performed by a handheld device with a camera for determining dimensions of a layout of a room having walls, the method comprising:

providing frames of a video as a user holding the camera rotates around a point in the room, the frames having directions;
for each corner of the room,
  providing mappings of locations of that corner within multiple frames; and
  determining a triangulated distance from the point in the room to that corner using triangulation based on the mappings and the directions of the frames;
selecting a scale for the room by minimizing the differences between the triangulated distances and calculated distances assuming that scale; and
calculating the dimensions of the walls of the room assuming the selected scale.

* * * * *